(12) United States Patent
Zhang et al.

(10) Patent No.: US 10,119,570 B2
(45) Date of Patent: Nov. 6, 2018

(54) HUB BEARING AND SEAL DEVICE (71) Applicant: Schaeffler Technologies AG & Co. KG, Herzogenaurach (DE)

(72) Inventors: Jianchang Zhang, Shanghai (CN); Chenxi He, Shanghai (CN); Zhongdong Chai, Shanghai (CN)

(73) Assignee: SCHAEFFLER TECHNOLOGIES G & CO KG, Herzogenaurach (DE)

( * ) Notice: Subject to any disclaimer, the term of this patent is extended or adjusted under 35 U.S.C. 154(b) by 0 days.

(21) Appl. No.: 15/543,088

(22) PCT Filed: Jan. 20, 2016

(86) PCT No.: PCT/CN2016/071457
§ 371 (c)(1),
(2) Date: Jul. 12, 2017

(87) PCT Pub. No.: WO2016/116046
PCT Pub. Date: Jul. 28, 2016

(65) Prior Publication Data
US 2018/0003235 A1 Jan. 4, 2018

(30) Foreign Application Priority Data

Jan. 20, 2015 (CN) .......................... 2015 1 0026786

(51) Int. Cl.
*F16C 33/78* (2006.01)
*F16C 19/18* (2006.01)
(Continued)

(52) U.S. Cl.
CPC ...... *F16C 33/7823* (2013.01); *B60B 27/0073* (2013.01); *F16C 19/18* (2013.01);
(Continued)

(58) Field of Classification Search
CPC ...... F16C 19/186; F16C 33/76; F16C 33/783; F16C 33/7823; F16C 2326/02;
(Continued)

(56) References Cited

U.S. PATENT DOCUMENTS 2,253,904 A * 8/1941 Haug ..................... F16J 15/164
277/553
4,161,120 A * 7/1979 Cloarec ................... G01P 3/443
324/173
(Continued)

FOREIGN PATENT DOCUMENTS

CN  2468621 Y  1/2002
CN  203470086 U  3/2014
(Continued)

OTHER PUBLICATIONS

Extended European Search Report for European Application No. EP16739793.4, Dated May 11, 2018, 9 Pages.

*Primary Examiner* — Marcus Charles
(74) *Attorney, Agent, or Firm* — Antun M. Peakovic (57) ABSTRACT

A hub bearing and a seal device therefore are disclosed. In one example, the hub bearing seal device includes inner and outer rings, a ring-shaped seal, and a seal retaining ring. A metallic framework is provided inside the seal. The seal is fixed to the outer ring via the metallic framework and a seal lip edge is provided on the metallic framework of the seal. The seal lip edge is in contact with the seal retaining ring in interference fit. The seal is further provided with another layer of metallic framework having a different thermal expansion coefficient from that of the metallic framework. Together, the metallic frameworks form a bimetallic sheet type framework. During the operation of the seal device, the bimetallic sheet type framework can adjust the amount of
(Continued)

interference between the seal lip edge and the seal retaining ring dynamically according to temperature change.

20 Claims, 4 Drawing Sheets

(51) Int. Cl.
    *F16J 15/32*         (2016.01)
    *B60B 27/00*        (2006.01)
    *F16J 15/16*         (2006.01)
    *F16J 15/3264*      (2016.01)
    *F16C 19/52*        (2006.01)

(52) U.S. Cl.
    CPC ......... *F16C 33/7883* (2013.01); *F16J 15/164* (2013.01); *F16J 15/32* (2013.01); *F16J 15/3264* (2013.01); *F16C 19/184* (2013.01); *F16C 19/525* (2013.01); *F16C 2326/02* (2013.01)

(58) Field of Classification Search
    CPC .. F16C 41/007; F16J 15/3232; F16J 15/3256; F16J 15/3208; F16J 15/164; B60B 27/0005; B60B 27/0073; B60B 27/0094; G01P 3/443; G01P 3/481
    USPC ....... 384/477, 479, 484–486, 504, 544, 589; 277/351, 402, 407, 383, 413; 324/173
    See application file for complete search history.

(56) References Cited

U.S. PATENT DOCUMENTS

| | | | | |
|---|---|---|---|---|
| 4,424,865 A * | 1/1984 | Payton, Jr. | .......... | E21B 33/1208 138/89 |
| 4,432,557 A * | 2/1984 | Drucktenhengst | ... | F16J 15/3256 277/351 |
| 4,658,847 A * | 4/1987 | McCrone | ................ | E06B 5/164 137/72 |
| 4,844,485 A * | 7/1989 | Antonini | ................ | F16J 15/164 277/553 |
| 5,135,236 A * | 8/1992 | Kruk | ................... | F16C 33/7813 277/572 |
| 6,126,322 A * | 10/2000 | Otsuki | .................. | F16C 19/386 277/573 |
| 6,497,514 B2 * | 12/2002 | Maldera | .................. | B60B 27/00 277/353 |
| 6,547,250 B1 * | 4/2003 | Noble | .................. | F04B 53/143 277/309 |
| 6,729,626 B2 * | 5/2004 | Ruetter | ................. | F16C 33/768 277/572 |
| 2008/0079222 A1 * | 4/2008 | Namuduri | .............. | F16J 15/164 277/359 |

FOREIGN PATENT DOCUMENTS

| | | | | |
|---|---|---|---|---|
| CN | 104053934 A | | 9/2014 | |
| DE | 19938246 C1 | * | 4/2001 | ........... F16J 15/3264 |
| DE | 102006044272 A1 | * | 4/2008 | ......... B60B 27/0005 |
| DE | 102011086953 A1 | | 5/2013 | |
| DE | 102012204620 A1 | | 9/2013 | |
| DE | 102014222100 A1 | * | 5/2016 | ........... F16J 15/3208 |
| GB | 695408 A | * | 8/1953 | ........... F16J 15/3248 |
| JP | 2002323055 A | | 11/2002 | |
| JP | 2005265079 A | | 9/2005 | |
| JP | 5327603 B2 | * | 10/2013 | ......... F16C 33/7883 |
| WO | WO-2006080209 A1 | * | 8/2006 | ............ F16C 19/187 |
| WO | WO-2013076150 A1 | * | 5/2013 | ............. F16J 15/164 |
| WO | 2013081075 A1 | | 6/2013 | |

* cited by examiner

HUB BEARING AND SEAL DEVICE

CROSS-REFERENCE TO RELATED APPLICATIONS

This application is the U.S. National Phase of PCT Appln. No. PCT/CN2016/071457 filed Jan. 20, 2016, which claims priority to CN 201510026786.9 filed Jan. 20, 2015, the entire disclosures of which are incorporated by reference herein.

TECHNICAL FIELD

In a first aspect, the disclosure relates to a seal device for a hub bearing. More particularly, the disclosure relates to a hub bearing seal device, in which a seal is used to cover a space between an inner ring and an outer ring of the hub bearing, and a seal retaining ring is axially arranged on an outer side of the seal. In a second aspect, the disclosure relates to a hub bearing.

BACKGROUND

A hub bearing for use in a vehicle may include a seal device, which uses a ring-shaped seal to cover a space between an outer ring and an inner ring so as to inhibit the intrusion of foreign matters (such as water and dust) into the interior of the bearing and to prevent lubricant grease from leaking. In addition, since the hub bearing is required to allow a relative rotation between the inner ring and the outer ring, the outer circumference of the seal is fixed to the outer ring, and the inner circumference of the seal forms a sliding contact with the inner ring.

However, only with the seal covering the space between the outer ring and the inner ring, it is impossible to obtain a sufficient sealing performance for preventing water and dust from intruding into the bearing from the outside and preventing grease from leaking, and it is also hard to inhibit the grease leakage and to inhibit the intrusion of water and dust into the interior of the bearing from the space between the inner circumference of the seal and the inner ring.

Generally, in order to prevent foreign matters from intruding into the hub bearing, a seal retaining ring in the form of a shield plate is provided on an outer side of the seal in an axial direction. The seal retaining ring is fixed to the inner ring, and the inner circumference of the seal forms a contact with the seal retaining ring.

Figure 1:
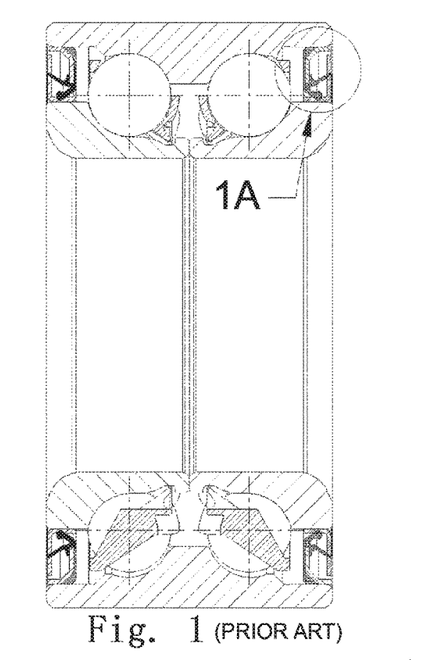
FIG. 1 is a cross-sectional view of a hub bearing in the prior art.
Figure 1A:
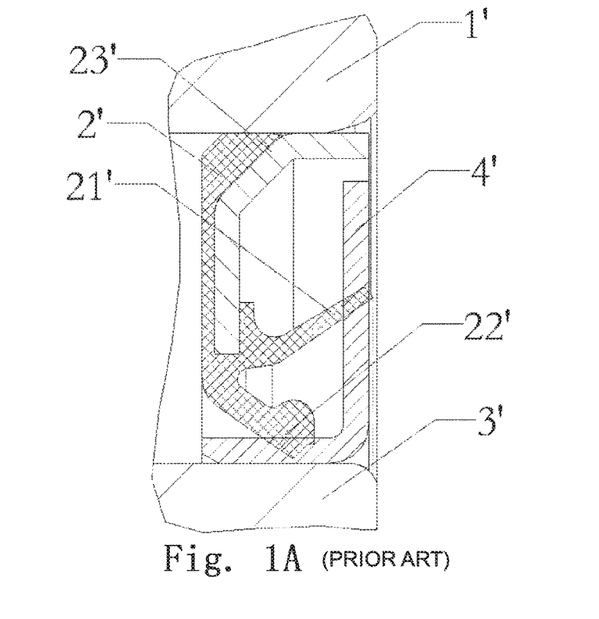
FIG. 1A is an enlarged view of a portion 1A relating to a hub bearing seal device in FIG. 1.

FIG. 1 shows a conventional hub bearing seal device as described above, wherein FIG. 1 is a cross-sectional view of a hub bearing according to the prior art, and FIG. 1A is an enlarged view of a portion 1A in FIG. 1. In FIG. 1, the hub bearing is a double row ball bearing, comprising: an outer ring 1'; an inner ring 3'; a retainer (not shown) for retaining double rows of balls (not indicated); a seal 2' for covering a space defined between the inner ring 3' and the outer ring 1'; and a seal retaining ring 4' arranged on the outer side of the seal 2' in an axial direction of the hub bearing. The inner ring 3', the outer ring 1', the seal 2' and the seal retaining ring 4' constitute the hub bearing seal device.

As shown in FIG. 1A, the outer circumference of the seal 2' is fixed to the outer ring 1' and is in a stationary state together with the outer ring 1'. The seal retaining ring 4' is fixed to the inner ring 3' and rotates together with the inner ring 3'. In FIG. 1A, the seal retaining ring 4' is a ring-shaped metallic plate, which is bent into an L shape, one leg of which extends towards the interior of the hub bearing and is fixed to the inner ring 3'. In addition, the seal 2' is provided therein with a metallic framework 23', with which the outer circumference of the seal 2' and the outer ring 1' are fixed together. A first radial seal lip edge 22' and a second axial seal lip edge 21' are injection molded onto the metallic framework 23' of the seal 2', which two seal lip edges extend in the radial direction and the axial direction of the hub bearing and are brought into contact with the two legs of the L-shaped seal retaining ring 4' in interference fit, respectively. Sealing is achieved by setting the degree of interference of the seal lip edges with the seal retaining ring, i.e., the amount of interference, wherein the first radial seal lip edge 22' prevents the grease from leaking, and the second axial seal lip edge 21' prevents external pollutants such as water and dust from intruding into the interior of the hub bearing.

In the hub bearing seal device of the prior art, the seal body forms the seal 2' together with the metallic framework 23'.

Figure 2A:
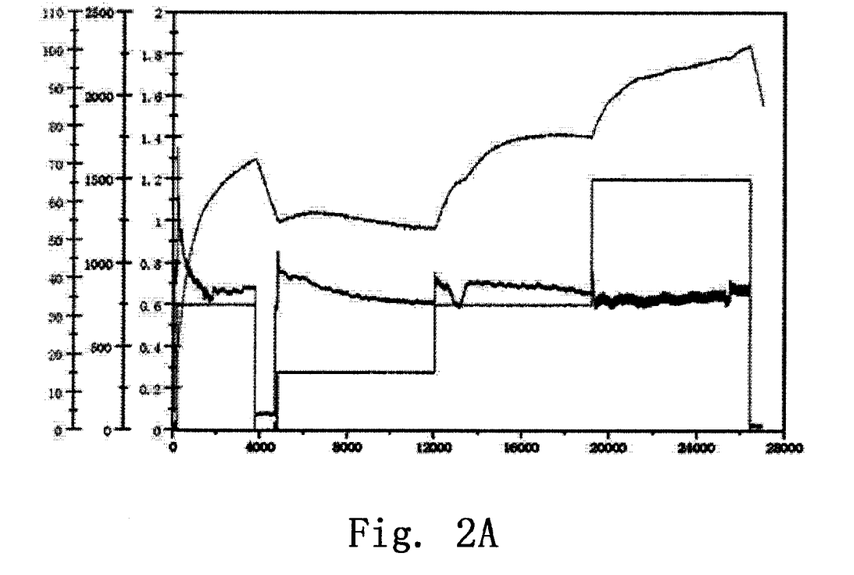
FIGS. 2A-2B are schematic views of the friction toques generated with a seal and without a seal, respectively.
Figure 2B:
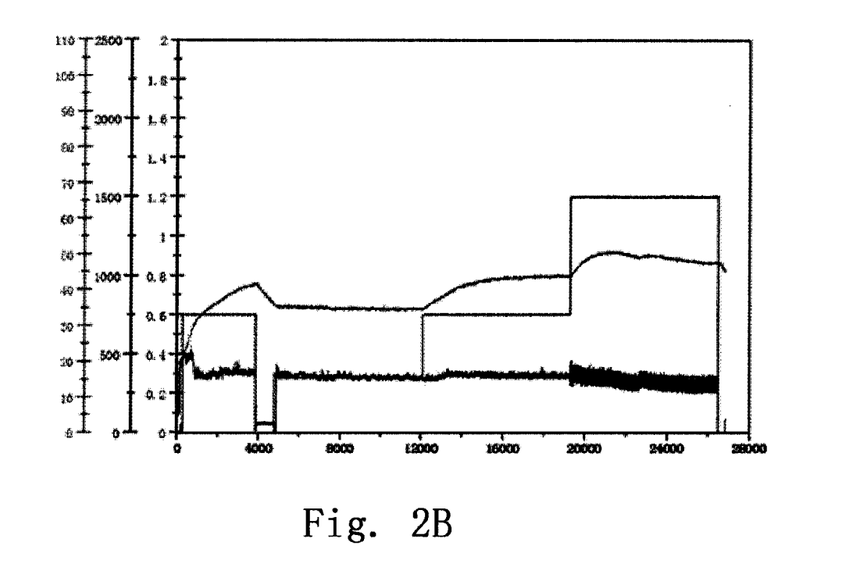

A conventional hub bearing, which is provided with a seal 2' as described above, for example, has a high starting torque, which is greatly higher than a running torque. As shown in FIGS. 2A-2B, the hub bearing with the seal has a running torque of 0.61 Nm, the hub bearing without the seal has a running torque of 0.29 Nm, the hub bearing with the seal has a starting torque of 1.35 Nm, and the hub bearing without the seal has a starting torque of 0.43 Nm. It can be obtained from the above that the starting torque generated by the seal is 0.92 Nm, which value is 2.14 times the starting torque of the hub bearing without the seal. The reason is when the bearing starts up, a high friction torque is generated due to the interference contact between the seal lip edges of the seal and the seal retaining ring.

In addition, since the lubrication is insufficient during the starting up stage, the friction torque generated by the seal accounts for a large proportion of the starting torque of the hub bearing. Further, since the starting torque is high and therefore it is not easy to start up, the conventional hub bearing requires a stronger drive device, which influences the performance of the hub bearing.

Thus there is a need for an improved hub bearing seal device.

SUMMARY

The disclosure provides a hub bearing seal device, comprising a hub bearing inner ring, a hub bearing outer ring, a ring-shaped seal, and a seal retaining ring. The seal retaining ring is fixed to the inner ring, and the outer circumference of the seal is fixed to the outer ring. The seal is provided therein with a metallic framework, with which the outer circumference of the seal is fixed to the outer ring. The seal is provided with a radial seal lip edge and an axial seal lip edge on the metallic framework, which seal lip edges are brought into contact with the seal retaining ring in interference fit in the radial direction and the axial direction of the hub bearing, respectively. The hub bearing seal device of the disclosure is characterized in that the seal is further provided therein with another layer of metallic framework, which is provided radially inside the metallic framework and has a different thermal expansion coefficient from that of the metallic framework, thereby forming a bimetallic sheet type framework with the metallic framework. The bimetallic sheet type framework is configured to dynamically adjust the amount of interference between the radial and axial seal lip edges and the seal retaining ring as the temperature changes when the seal device is in operation.

According to an embodiment of the disclosure, the bimetallic sheet type framework is configured to increase the amount of interference between the seal lip edges and the seal retaining ring as the temperature increases.

As compared with a conventional hub bearing seal device, the hub bearing seal device of the disclosure employs a bimetallic sheet type framework instead of a typical metallic framework. In operation, the bimetallic sheet type framework changes the amount of interference between the radial and axial seal lip edges and the seal retaining ring as the temperature changes, especially during the starting up and running stages. During the starting up, since the starting up temperature is low and the amount of interference is small, a friction torque is small, and at the same time lubricant grease is well sealed. Thus, the starting torque of the hub bearing is reduced, while duct proof and sealing effects are ensured. Meanwhile, during the running stage, the hub bearing is running at a high temperature, an oil film is well formed, the seal lip edges work under a sealing condition, and the amount of interference is appropriate although it is increased. Since the temperature is high, the lubricant grease works well, and the amount of interference is appropriate during the stable running stage, the lubricant grease is well sealed and the friction torque is appropriate.

Preferably, at a normal temperature during the starting up of the hub bearing, the inner layer of metallic framework in the bimetallic sheet type framework contracts inwardly so as to bend the seal inwardly, such that both the radial and axial seal lip edges move away from the seal retaining ring simultaneously to reduce the amount of interference between the bearing seal lip edges and the seal retaining ring, thereby reducing the friction torque between the seal lip edges and the seal retaining ring. Optionally, at a normal temperature during the staring up, the inner layer of metallic framework in the bimetallic sheet type framework may be in a normal state, i.e., it neither contracts nor expands.

After the starting up of the hub bearing, a lubricant oil film is gradually formed, and the temperature of the bearing gradually increases. As the temperature increases, the inner layer of metallic framework in the bimetallic sheet type framework expands outwardly so as to bend the seal outwardly, such that the radial and axial seal lip edges move towards the seal retaining ring to increase the amount of interference between the seal lip edges of the bearing and the seal retaining ring till the hub bearing reaches a stable working temperature where the metallic framework layer changes from an inward contraction state to a normal state or from a normal state to an expansion state.

According to an embodiment of the disclosure, the seal lip edges of the bearing are injection molded onto the bimetallic sheet type framework.

According to an embodiment of the disclosure, the seal retaining ring is bent into an L shape, one leg of which extends towards the interior of the hub bearing and is fixed to the inner ring. The seal lip edges include a first radial seal lip edge and a second axial seal lip edge that are brought into contact with the two legs of the seal retaining ring in interference fit, respectively. The first radial seal lip edge, which is brought into contact with the one leg fixed to the inner ring, prevents the grease from leaking, and the second axial seal lip edge prevents external pollutants such as water and dust from intruding into the interior of the hub bearing. The friction torque of the hub bearing is generated by the friction between the first radial seal lip edge, the second axial seal lip edge and the seal retaining ring. The friction torque generated by the first radial seal lip edge is greater than the friction torque generated by the second axial seal lip edge. The shape of the bimetallic sheet type framework can change as the temperature changes so as to change the friction torques between the first radial and second axial seal lip edges and the seal retaining ring.

According to an embodiment of the disclosure, the second axial seal lip edge expands towards the exterior of the hub bearing in an axial direction on a side surface of the seal that faces the seal retaining ring.

According to an embodiment of the disclosure, the first radial seal lip edge expands towards the inner ring in a radial direction on a side surface of the seal that faces the seal retaining ring.

According to an embodiment of the disclosure, preferably, the bimetallic sheet type framework is provided thereon with circumferential slots. Preferably, the circumferential slots are evenly arranged in a circumferential direction. By means of the slots on the bimetallic sheet type framework, an internal stress due to deformation is reduced. Thus, provided that a certain strength is given, it would be possible to better respond to the temperature change.

The disclosure also provides a hub bearing, characterized in that it comprises a hub bearing seal device as described above.

As compared with a conventional hub bearing, the hub bearing according to the disclosure has the following advantages.

1. It has a simple structure, is easy to be manufactured, and has a low manufacturing cost.

2. The amount of interference between the radial and axial seal lip edges and the seal retaining ring is adjusted to obtain an ideal starting torque.

3. During the starting up, the rotation speed is low, lubrication is insufficient, and the amount of interference between the radial and axial seal lip edges and the seal retaining ring is small, so that the starting torque can be reduced while ensuring a sealing effect.

4. During the starting up, a lubricant oil film has possibly not been formed yet, and the amount of interference between the radial and axial seal lip edges and the seal retaining ring is small, so that a damage caused by the dry friction between the seal lip edges and the seal retaining ring can be effectively avoided.

5. During the starting up, the friction generated by both the first radial seal lip edge and the second axial seal lip edge is reduced, so that a large proportion of the friction is reduced, significantly reducing the starting torque.

6. The interference between the radial and axial seal lip edges and the seal retaining ring is controlled by the temperature change. When the temperature does not change, the amount of interference keeps stable. This is particularly suitable for the sealing of the hub bearing.

8. The hub bearing seal device reduces the starting torque while ensuring a sealing effect in the working state.

BRIEF DESCRIPTION OF THE DRAWINGS

Those skilled in the art will understand the advantages of the above and other aspects of the disclosure by means of the detailed description of the following exemplary embodiments with reference to the figures. In the figures.

LIST OF REFERENCE SIGNS

1' outer ring
2' seal
3' inner ring
4' seal retaining ring
21' second axial seal lip edge
22' first radial seal lip edge
23' metallic framework
1 outer ring
2 seal
3 inner ring
4 seal retaining ring
21 second axial seal lip edge
22 first radial seal lip edge
23 metallic framework
24 metallic framework layer
25 slot

DETAILED DESCRIPTION

In the detailed description of the following exemplary embodiments, the individual features and aspects of the disclosure will be described with reference to FIGS. 3-4.

Figure 3:
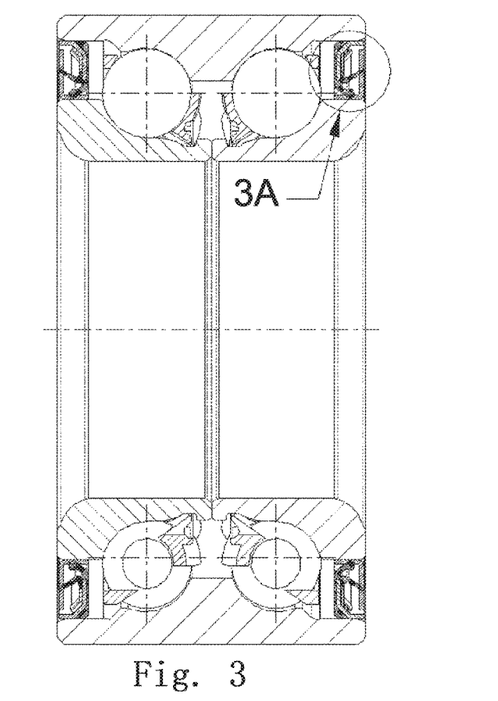
FIG. 3 is a cross-sectional view of a hub bearing of an embodiment of the disclosure.
Figure 3A:
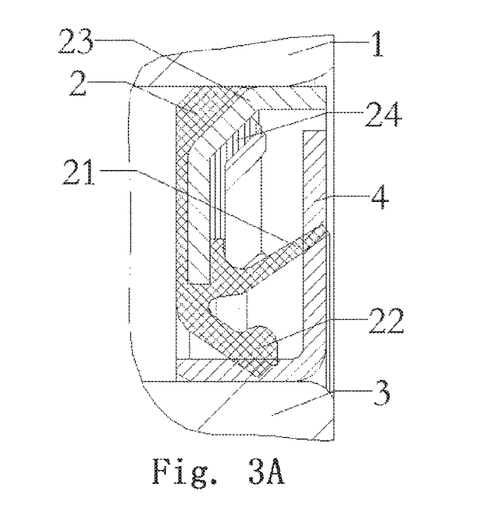
FIG. 3A is an enlarged view of a portion 1A relating to a hub bearing seal device in FIG. 3.

FIG. 3 shows a partial cross-sectional view of a hub bearing seal device of a hub bearing according to an embodiment of the disclosure. FIG. 3A shows an enlarged view of a portion 1A of the hub bearing seal device as shown in FIG. 3.

In FIG. 3, the hub bearing is a double row ball bearing, comprising: an outer ring 1; an inner ring 3; a retainer (not shown) for retaining double rows of balls (not indicated); a seal 2 (made of, for example, a rubber material) for covering a space defined between the inner ring 3 and the outer ring 1; and a seal retaining ring 4 arranged on the outer side of the seal 2 in the axial direction of the hub bearing. The inner ring 3, the outer ring 1, the seal 2 and the seal retaining ring 4 constitute a hub bearing seal device.

As shown in FIG. 3A, the outer circumference of the seal 2 is fixed to the outer ring 1 and is in a stationary state together with the outer ring 1. The seal retaining ring 4 is fixed to the inner ring 3 and rotates together with the inner ring 3. In FIG. 3A, the seal retaining ring 4 is a ring-shaped metallic plate, which is bent into an L shape, one leg of which extends towards the interior of the hub bearing and is fixed to the inner ring 3. In addition, the seal 2 is provided therein with a metallic framework 23, with which the outer circumference of the seal 2 and the outer ring 1 are fixed together. A first radial seal lip edge 22 and a second axial seal lip edge 21 are injection molded onto the metallic framework 23 of the seal 2, which two seal lip edges extend in the radial direction and the axial direction of the hub bearing and are brought into contact with the two legs of the L-shaped seal retaining ring 4 in interference fit, respectively. Sealing is achieved by setting the amount of interference between the seal lip edges and the seal retaining ring, wherein the first radial seal lip edge 22 prevents the grease from leaking, and the second axial seal lip edge 21 prevents external pollutants such as water and dust from intruding into the interior of the hub bearing.

A side surface of the seal retaining ring 4 that faces the seal 2 is formed as a flat surface parallel to the side surface of the seal 2.

In addition, the seal 2 is further provided therein with another layer of metallic framework 24, which is arranged radially inside the metallic framework 23. The metallic framework layer has a different thermal expansion coefficient from that of the metallic framework 23, and thus forms a bimetallic sheet type framework with the metallic framework 23. In the embodiment, the thermal expansion coefficient of the bimetallic sheet type framework is selected to reduce the amount of interference between the seal lip edges 21 and 22 and the seal retaining ring 4 at a low temperature, and to increase the amount of interference between the seal lip edges 21 and 22 and the seal retaining ring 4 as the temperature increases. For example, it can be set in such a way that at the starting up temperature, the inner layer of metallic framework 24 contracts inwardly, while at the working temperature, the inner layer of metallic framework layer returns to its normal state. Alternatively, at the starting up temperature, the inner layer of metallic framework 24 is in its normal state, while at the working temperature, the inner layer of metallic framework 24 expands outwardly.

The second axial seal lip edge 21 expands towards the exterior of the hub bearing in an axial direction on a side surface of the seal 2 that faces the seal retaining ring 4. And the first radial seal lip edge 22 expands towards the inner ring 3 in a radial direction on a side surface of the seal 2 that faces the seal retaining ring 4.

Figure 4:
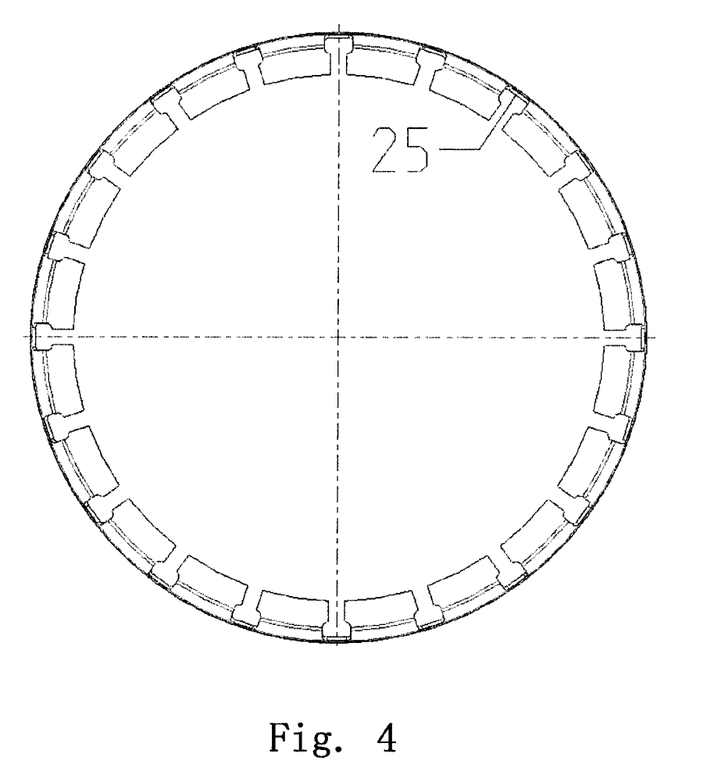
FIG. 4 is a schematic diagram of a bimetallic sheet type framework of a hub bearing seal device of an embodiment of the disclosure.

In order to reduce an internal stress due to deformation of the bimetallic sheet type framework, circumferential slots 25 are evenly provided on the bimetallic sheet type framework in a circumferential direction, as shown in FIG. 4.

In the hub bearing seal device of the embodiment of the disclosure, the seal body forms the seal 2 together with the bimetallic sheet type framework consisting of the metallic framework 23 and the metallic framework layer 24.

In the embodiment, at a normal temperature during the starting up of the hub bearing, the inner layer of metallic framework 24 of the bimetallic sheet type framework contracts inwardly so as to bend the seal 2 inwardly, such that the seal lip edges 21, 22 move away from the seal retaining ring 4 simultaneously to reduce the amount of interference between the seal lip edges 21, 22 and the seal retaining ring 4, thereby reducing the friction torque between the seal lip edges 21, 22 and the seal retaining ring 4. Since the temperature is low and the amount of interference is small during the starting up, a friction torque is small, and at the same time lubricant grease is well sealed. Thus, a starting torque of the hub bearing is reduced, while duct proof and sealing effects are ensured.

After the starting up of the hub bearing, a lubricant oil film is gradually formed, and the temperature of the bearing gradually increases. As the temperature increases, the inner layer of metallic framework 24 of the double metallic sheet type framework expands outwardly so as to bend the seal 2 outwardly, such that the seal lip edges 21, 22 move towards the seal retaining ring 4 to increase the amount of interference between the seal lip edges 21, 22 of the bearing and the seal retaining ring 4 till the hub bearing reaches a stable working temperature where the metallic framework layer 24 returns to its normal state. Meanwhile, the oil film is well formed, the seal lip edges 21, 22 work under a sealing condition, and the amount of interference is appropriate.

The disclosure has been described above with reference to the exemplary embodiments. However, those skilled in the art can think of other variations and replacements upon reading and understanding the Description and Drawings of the disclosure. For example, in the embodiment, the second axial seal lip edge 21 expands towards the exterior of the hub bearing in an axial direction on a side surface of the seal 2 that faces the seal retaining ring 4, and the seal retaining ring 4 is fixed to the inner ring 3. However, the second axial seal lip edge can also expand towards the inner ring in a radial direction on a side surface of the seal that faces the seal retaining ring, and the seal retaining ring can be also directly fixed to a shaft to which the hub bearing is mounted. Thus, the disclosure is not limited to the embodiments described above, and modifications and variations may be made to the disclosure within the scope of the Claims. The disclosure is intended to cover all of the variations and replacements, which fall within the scope of the accompanying Claims and equivalents thereof.

The invention claimed is:

1. A seal device for a hub bearing, comprising:
   a hub bearing inner ring, a hub bearing outer ring, a ring-shaped seal, and a seal retaining ring, the seal retaining ring being fixed to the inner ring, the outer circumference of the seal being fixed to the outer ring;
   the seal being provided therein with a metallic framework, with which the outer circumference of the seal is fixed to the outer ring, the seal being provided with a seal lip edge on the metallic framework, and the seal lip edge being brought into contact with the seal retaining ring in interference fit;
   the seal is further provided therein with another layer of metallic framework, which is arranged radially inside the metallic framework, has a different thermal expansion coefficient from that of the metallic framework, and forms a bimetallic sheet type framework with the metallic framework; and
   the bimetallic sheet type framework is configured to dynamically adjust the amount of interference between the seal lip edge and the seal retaining ring as the temperature changes when the seal device is in operation.

2. The seal device according to claim 1, wherein the bimetallic sheet type framework is configured to increase the amount of interference between the seal lip edge and the seal retaining ring as the temperature increases.

3. The seal device according to claim 2, wherein the bimetallic sheet type framework is configured to be brought into an inward contraction state when the hub bearing starts up, and into a normal state when the hub bearing is in a working state.

4. The seal device according to claim 2, wherein the bimetallic sheet type framework is configured to be brought into a normal state when the hub bearing starts up, and into an expansion state when the hub bearing is in a working state.

5. The seal device according to claim 1, wherein the seal lip edge of the bearing is injection molded onto the bimetallic sheet type framework.

6. The seal device according to claim 1, wherein the bimetallic sheet type framework is provided thereon with a circumferential slot.

7. The seal device according claim 1, wherein the seal retaining ring is bent into an L shape, one leg which extends towards the interior of the hub bearing and is fixed to the inner ring, and the seal lip edge includes a first radial seal lip edge and a second axial seal lip edge that are brought into contact with the two legs of the seal retaining ring in interference fit, respectively.

8. The seal device according to claim 7, wherein the second axial seal lip edge expands towards the exterior of the hub bearing in an axial direction on a side surface of the seal that faces the seal retaining ring.

9. The seal device according to claim 7, wherein the first radial seal lip edge expands towards the inner ring in a radial direction on a side surface of the seal that faces the seal retaining ring.

10. A hub gearing, comprising a seal device according to claim 1.

11. A seal device for a hub bearing, comprising:
    a hub bearing inner ring and a hub bearing outer ring;
    a ring-shaped seal and a seal retaining ring;
    the seal retaining ring being fixed to the inner ring and an outer circumference of the seal being fixed to the outer ring;
    a first metallic framework, with which the outer circumference of the seal is fixed to the outer ring, the seal being provided with a seal lip edge on the metallic framework, and the seal lip edge being brought into contact with the seal retaining ring in interference fit;
    a second metallic framework, which is arranged radially inside the first metallic framework, and has a different thermal expansion coefficient from that of the first metallic framework, the first and second metallic frameworks forming a bimetallic sheet type framework; and
    the bimetallic sheet type framework being configured to dynamically adjust an amount of interference between the seal lip edge and the seal retaining ring as the temperature changes when the seal device is in operation.

12. The seal device according to claim 11, wherein the bimetallic sheet type framework is configured to increase the amount of interference between the seal lip edge and the seal retaining ring as the temperature increases.

13. The seal device according to claim 11, wherein the seal lip edge of the bearing is injection molded onto the bimetallic sheet type framework.

14. The seal device according to claim 12, wherein the bimetallic sheet type framework is configured to be brought into an inward contraction state when the hub bearing starts up, and into a normal state when the hub bearing is in a working state.

15. The seal device according to claim 12, wherein the bimetallic sheet type framework is configured to be brought into a normal state when the hub bearing starts up, and into an expansion state when the hub bearing is in a working state.

16. The seal device according to claim 11, wherein the bimetallic sheet type framework is provided thereon with a circumferential slot.

17. The seal device according claim 11, wherein the seal retaining ring is L-shaped, including one leg which extends towards the interior of the hub bearing and is fixed to the inner ring; and
    the seal lip edge includes a first radial seal lip edge and a second axial seal lip edge that are brought into contact with the two legs of the seal retaining ring in interference fit, respectively.

18. The seal device according to claim 17, wherein the second axial seal lip edge expands towards the exterior of the hub bearing in an axial direction on a side surface of the seal that faces the seal retaining ring.

19. The seal device according to claim 17, wherein the first radial seal lip edge expands towards the inner ring in a radial direction on a side surface of the seal that faces the seal retaining ring.

20. A method of controlling an interference fit between a seal lip edge and a seal retaining ring in a hub bearing, comprising:
- injection molding a seal lip edge of a sealing ring onto a bimetallic sheet type framework, the bimetallic sheet type framework including:
  - a first metallic framework, with which an outer circumference of the sealing ring is fixed to a hub bearing outer ring, the seal being provided with a seal lip edge on the metallic framework, and the seal lip edge being brought into contact with a seal retaining ring fixed to a hub bearing inner ring in interference fit;
  - a second metallic framework, which is arranged radially inside the first metallic framework, and has a different thermal expansion coefficient from that of the first metallic framework; and
- dynamically adjusting an amount of interference between the seal lip edge and the seal retaining ring in response to a temperature change of the hub bearing.

* * * * *